(No Model.) 6 Sheets—Sheet 1.
A. WELIN.
BREECH MECHANISM FOR GUNS.

No. 552,560. Patented Jan. 7, 1896.

Witnesses
Guy E. Davis
B. W. Miller

Inventor
Axel Welin
By his Attorneys
Baldwin, Davidson & Wight (No Model.) 6 Sheets—Sheet 3.
A. WELIN.
BREECH MECHANISM FOR GUNS.
No. 552,560. Patented Jan. 7, 1896.
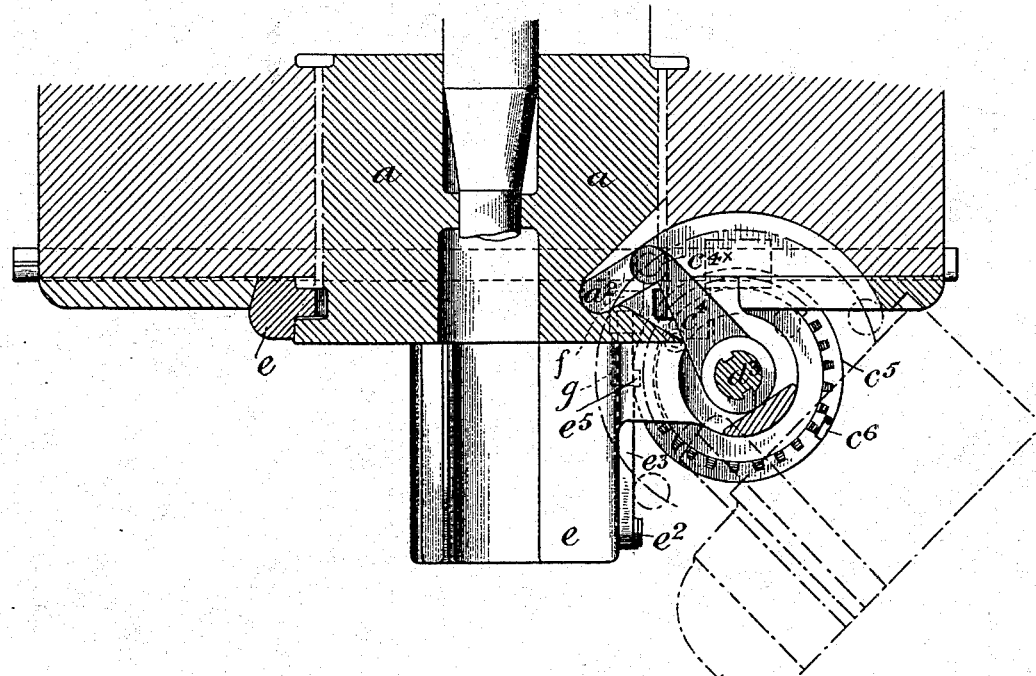
Fig. 3.
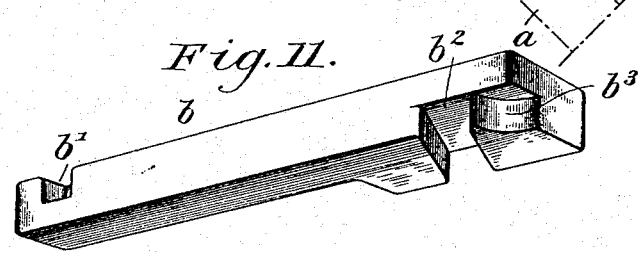
Fig. II.
Witnesses
Guy E. Davis
B. W. Miller
Inventor
Axel Welin
By his Attorneys
Baldwin Davidson & Wight (No Model.) 6 Sheets—Sheet 1.

A. WELIN.
BREECH MECHANISM FOR GUNS.

No. 552,560. Patented Jan. 7, 1896.

Witnesses
Guy T. Davis.
B. W. Miller.

Inventor
Axel Welin
By his Attorneys
Baldwin Davidson & Wight (No Model.) 6 Sheets—Sheet 5.

A. WELIN.
BREECH MECHANISM FOR GUNS.

No. 552,560. Patented Jan. 7, 1896.

Witnesses
Inventor (No Model.)  6 Sheets—Sheet 6.

A. WELIN.
BREECH MECHANISM FOR GUNS.

No. 552,560.  Patented Jan. 7, 1896.

Witnesses
Guy E. Davis.
B. W. Miller.

Inventor
Axel Welin
By his Attorneys
Baldwin Davidson & Wight

UNITED STATES PATENT OFFICE.

AXEL WELIN, OF LONDON, ENGLAND.

BREECH MECHANISM FOR GUNS.

SPECIFICATION forming part of Letters Patent No. 552,560, dated January 7, 1896.

Application filed September 13, 1895. Serial No. 562,441. (No model.) Patented in England July 11, 1894, No. 13,450; in France November 6, 1894, No. 242,648, and in Germany November 8, 1894, No. 82,315.

*To all whom it may concern:*

Be it known that I, AXEL WELIN, mechanical engineer, a subject of the King of Sweden and Norway, residing at 9 London Street, in the city of London, England, have invented certain new and useful Breech Mechanism for Guns, (for which I have received Letters Patent in Great Britain, No. 13,450, dated July 11, 1894; in Germany, No. 82,315, dated November 8, 1894, and in France, No. 242,648, dated November 6, 1894,) of which the following is a specification.

In opening the breech of a gun it requires much more force to start the breech-block than it does to continue to unscrew it, and similarly when the block has been unscrewed it requires more force to begin to draw it rearward than it does to continue the motion. Nevertheless in most existing mechanisms substantially the same leverage is obtained throughout the motion, and it therefore takes an unnecessarily long time to open the breech. The primary object of my invention is to remedy this defect.

Figure 1:
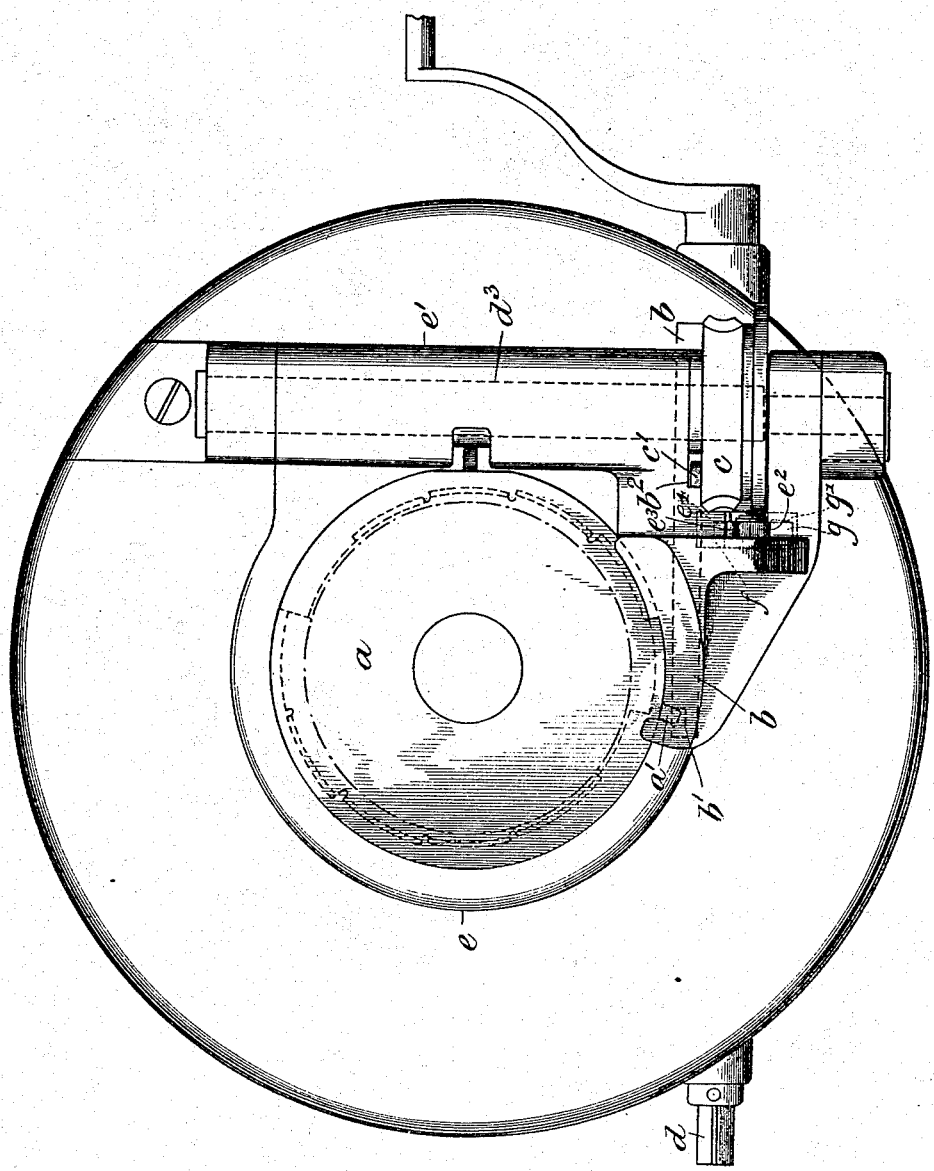
Figure 2:
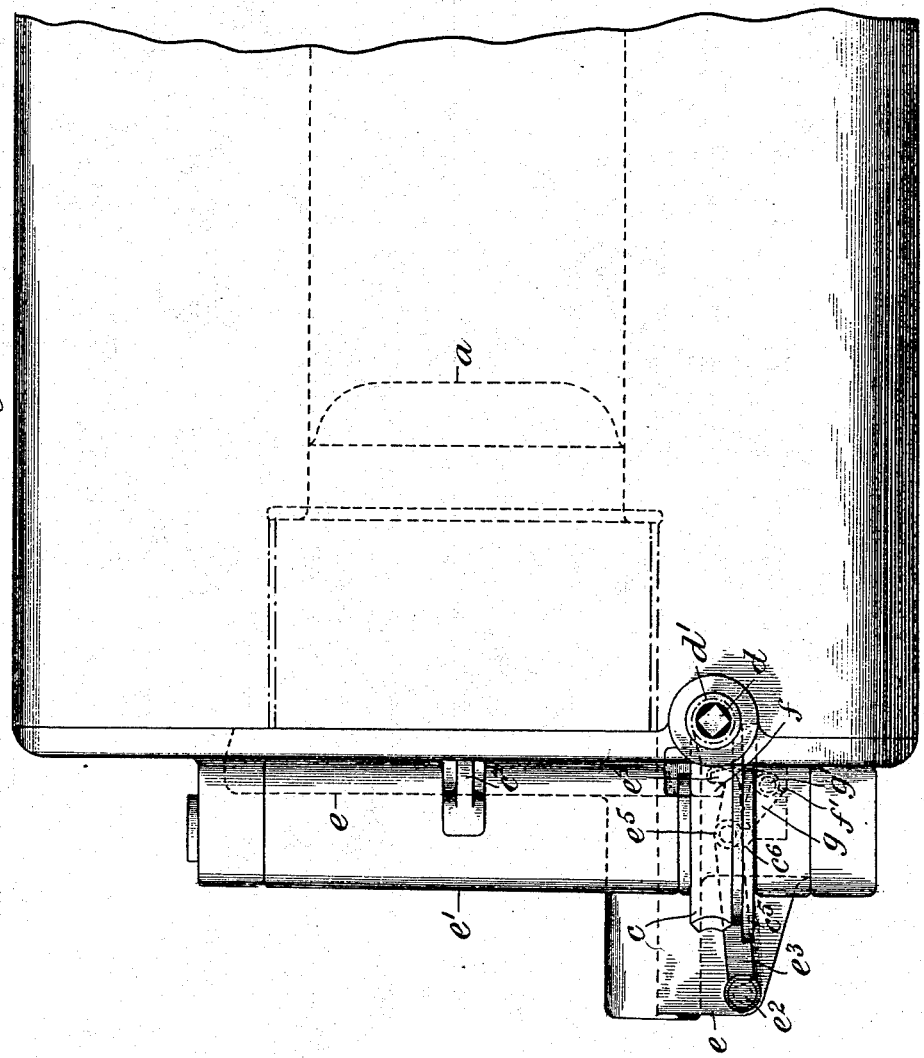
Figure 4:
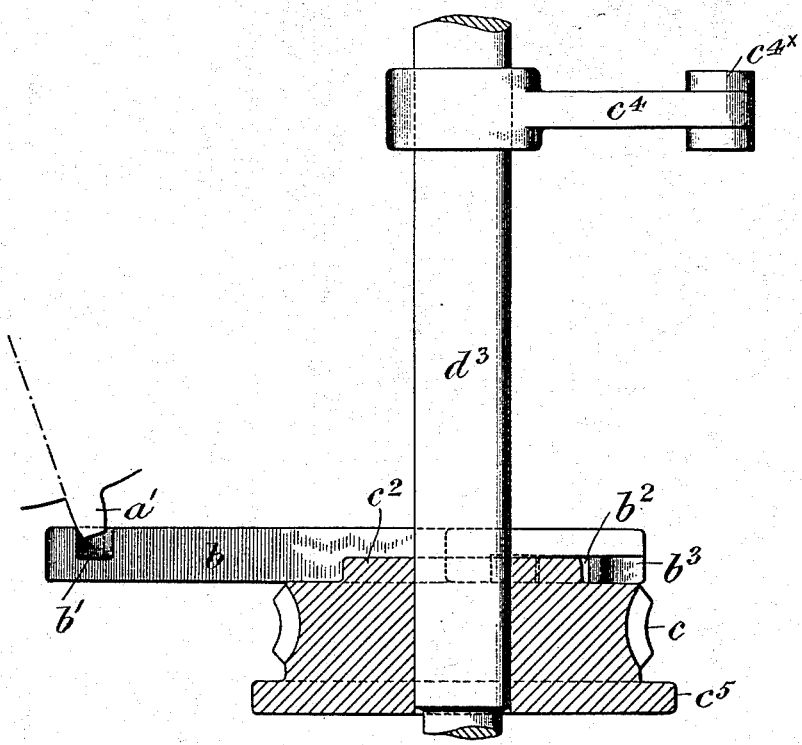
Figure 5:
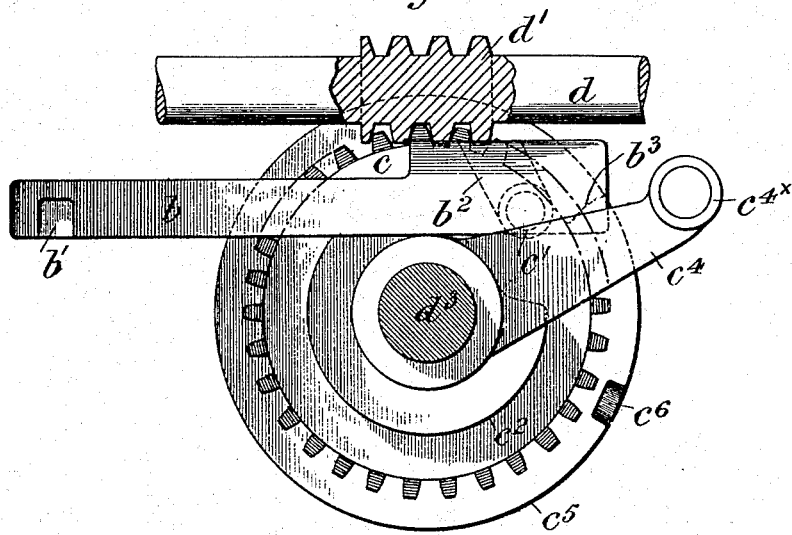
Figure 6:
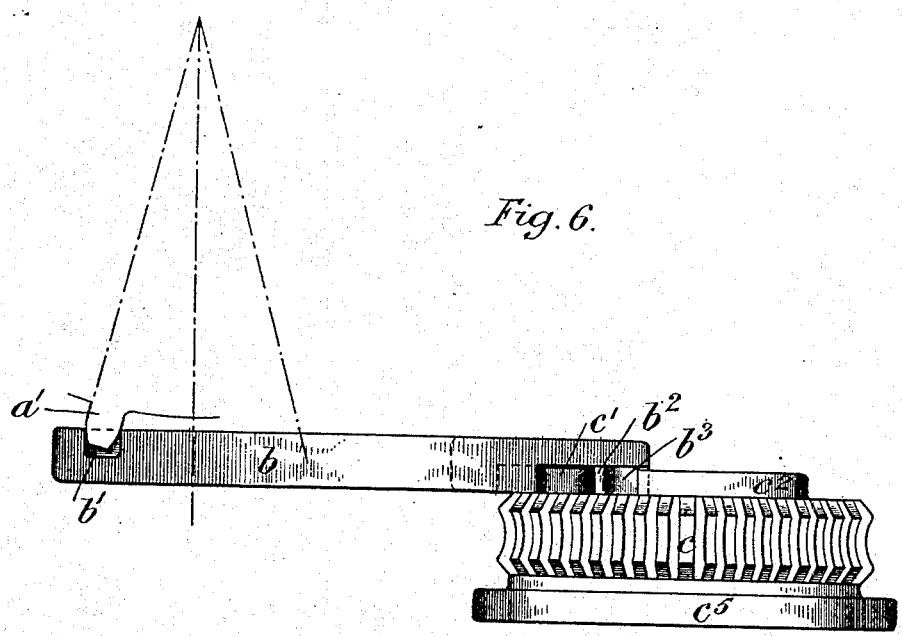
Figure 7:
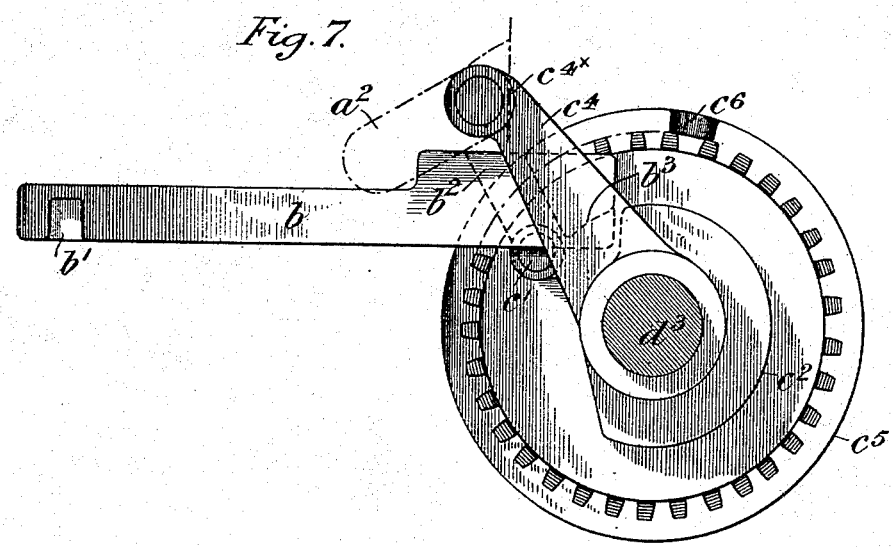
Figure 8:
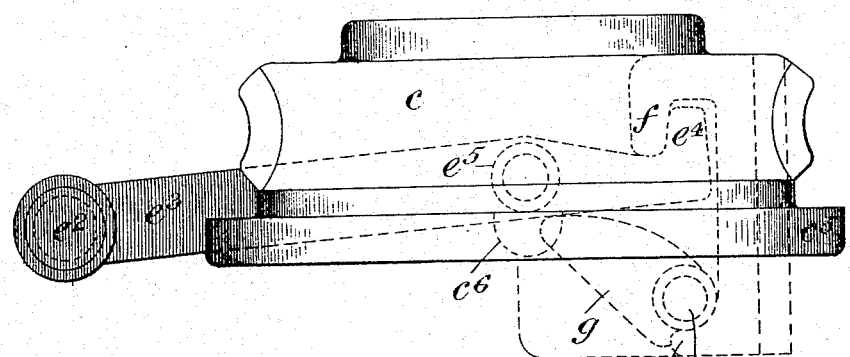
Figure 9:
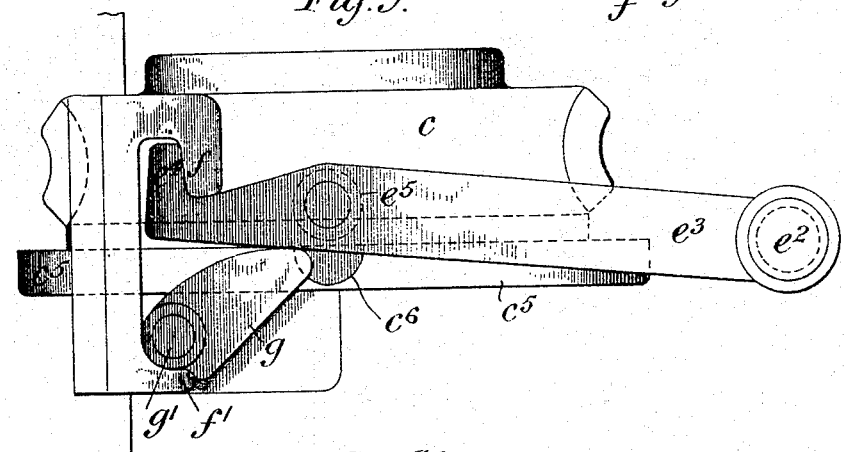
Figure 10:
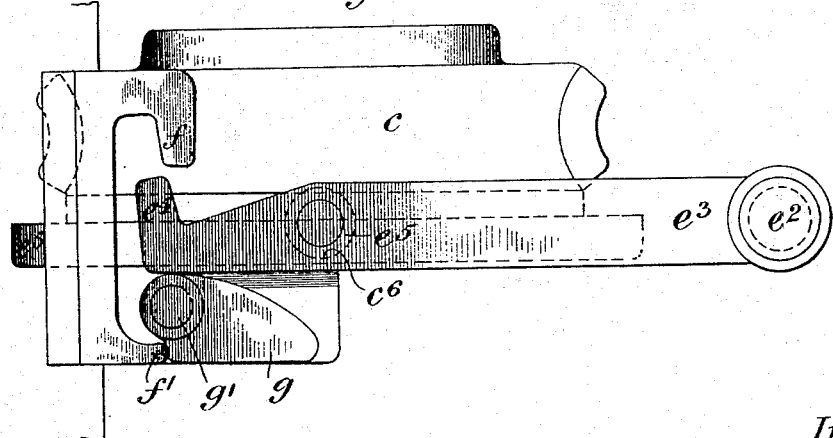

In the accompanying drawings, Figure 1 is a rear elevation of the gun, the breech-block being unscrewed but not swung back. Fig. 2 is a right-hand side elevation, and Fig. 3 a longitudinal central section, of the same. In the latter figure the position of the breech-block when swung back is also shown in dotted lines. Figs. 4 and 5 are an elevation and plan, partly in section, of some of the parts to a larger scale, showing the positions when the breech is closed; and Figs. 6 and 7 are similar views with the parts in the same positions as in Figs. 1 to 3. Fig. 8 shows a portion of Fig. 2 to a larger scale, and Fig. 9 is a corresponding left-hand elevation. Fig. 10 is a similar view to Fig. 9, but with the parts in a different position; and Fig. 11 is a bottom perspective view of the tangential slide employed for operating the breech-block.

The breech-block $a$ is unscrewed by the tangential slide $b$, which has a notch $b'$ engaging with a single tooth $a'$ on the block, and the leverage employed for traversing the slide diminishes when the block has been started. For this purpose the slide is slotted at $b^2$ to receive a roller $c'$, pivoted on the worm-wheel $c$, which is actuated by the worm $d'$ on the axis $d$ of the handle. It will be observed that when the breech is closed, as shown in Fig. 5, the slot $b^2$ is almost tangential to the path of the roller $c'$, and therefore in opening the breech the slide $b$ is at first moved very slowly and with great leverage; but as the breech-block is turned the leverage decreases and the speed increases until at last, as shown in Fig. 7, the slot $b^2$ is almost radial to the path of the roller $c'$. When the block is fully unscrewed, the roller $c'$ escapes from the slot $b^2$; but the slide $b$ is prevented from moving back again by the circular surface $c^2$ on the worm-wheel $c$, which now comes against the circular shoulder $b^3$ on the slide $b$. The slide $b$ is therefore held fast until in closing the gun the surfaces $c^2$ and $b^3$ disengage and the roller $c'$ again enters the slot $b^2$. It will be obvious that the roller might be on the slide and the slot in the worm-wheel.

The shaft $d^3$ of the worm-wheel is coaxial with the hinge $e'$ about which the carrier-ring $e$ of the breech-block $a$ swings. It has fixed to it an arm $c^4$, which during the first part of the motion travels in a slot in the rear end of the gun. The end of this arm carries a roller $c^{4\times}$, which when the breech-block $a$ has been unscrewed, as above described, enters a slot $a^2$ in it, as shown in Figs. 3 and 7. This slot is so arranged that at this time it is tangential or nearly so to the path of the roller, the result being that the breech-block is at first very slowly drawn back in its carrier-ring. This movement, however, makes the slot assume a less and less tangential direction until at last it is radial or nearly so, and therefore the speed of withdrawal continuously increases. When the breech-block $a$ has been drawn fully back in its carrier-ring $e$ the latter is unlocked, as hereinafter described, and the further rotation of the worm-wheel $c$ and arm $c^4$ causes the ring, with the block, to swing about its axis.

The carrier-ring $e$ has pivoted to it at $e^2$ a lever $e^3$, Figs. 2, 8, 9 and 10, having a hook $e^4$ at its end, which takes into a catch $f$ fixed to the rear end of the gun. The lever carries a roller $e^5$ bearing on a circular table $c^5$ fixed to the axis of the worm-wheel, and the hook is thereby kept in the catch $f$. As shown in Figs. 8 to 10 the faces of the hook $e^4$ and catch $f$ are inclined so that when the breech-block is being withdrawn and the carrier-ring $e$ has therefore a tendency to come away from the gun the consequent pressure between the faces tends to force the lever $e^3$ downward. Such a movement is, however, prevented by the roller $e^5$, which bears on the annular table $c^5$ on the worm-wheel $c$. $c^6$ is a notch or recess in the annular table $c^5$, and when the breech-block has been fully withdrawn from the gun by the rotation of the worm-wheel this notch comes beneath the roller $e^5$, as shown in Figs. 2, 8 and 9. $g$ is a lever pivoted at $g'$ in a recess in the carrier-ring $e$ and having its nose in contact with the under side of the lever $e^3$. When the carrier-ring is in contact with the breech the rear end of this lever bears against the projection $f'$ on the gun, as shown in Figs. 2, 8 and 9; but when the roller $e^5$ comes to the notch $c^6$, so that it no longer supports the lever $e^3$, the latter is forced downward by the pressure of the inclined catch $f$ on the inclined hook $e^4$, caused by the tendency of the carrier-ring to swing away from the rear of the gun, and immediately the downward movement of the lever $e^3$ commences the carrier-ring, owing to the inclined faces of the hook and catch, does begin to separate slightly from the gun, and as the lever $g$ is pivoted to the carrier-ring its tail end also tends to move slightly away from the projection $f'$, which is fixed to the gun, but does not actually separate from it because the weight of the lever turns it about its pivot, the form of the parts being such that the levers $e^3$ and $g$ descend together until they reach the positions shown in Fig. 10. The carrier-ring being now completely unlocked, swings away from the breech, turning about the axis $e'$ and carrying with it the lever $e^3$, worm-wheel $c$ and table $c^5$, which all rotate together, the roller $e^5$ lying in the notch $c^6$ the whole time the breech is open. Similarly in closing the breech when the carrier-ring is coming against the gun the tail end of the lever $g$ comes against the projection $f'$ and is thereby lifted, turning up the lever $e^3$ and causing it to engage with the catch $f$.

What I claim is—

1. The combination with the breech of a gun, of the breech block, a tangential slide operating it, a worm wheel, an incline diagonal to the line of movement of the slide, and a pin or roller engaging the incline and thereby connecting the slide with the worm wheel, a worm gearing with the worm wheel, and means for operating the worm.

2. The combination of the breech block, an incline in it, a worm wheel, an arm fixed to the worm wheel, a pin or roller on the arm engaging with the incline, a worm gearing with the worm wheel and means for operating the worm.

3. The combination of the breech block, a tangential slide operating it, a worm wheel, an incline on the slide or worm wheel, a pin or roller on the worm wheel or slide engaging with the incline, an incline in the breech block, an arm fixed to the worm wheel, a pin or roller on the arm engaging with the incline in the breech block, a worm gearing with the worm wheel and means for operating the worm.

4. The combination of the breech block, a carrier supporting it and a worm operating it, a hooked lever pivoted to the carrier, a catch on the gun with which the hooked lever engages, a pin or roller on the lever, a table on the worm wheel and supporting the pin or roller until the breech block has been fully withdrawn, a worm gearing with the worm wheel and means for operating the worm.

5. The combination of the breech block, a carrier supporting it and a worm wheel operating it, a hooked lever pivoted to the carrier, a catch on the gun with which the hooked lever engages, a pin or roller on the lever, a table on the worm wheel and supporting the pin or roller until the breech block has been fully withdrawn, a second lever pivoted to the carrier and having its nose bearing against the under side of the hooked lever, and its tail end against the gun, a worm gearing with the worm wheel and means for operating the worm.

AXEL WELIN.

Witnesses:
WALTER J. SKERTEN,
GEO. M. BUNKLIN.